(12) United States Patent
Yoshida

(10) Patent No.: US 8,517,453 B2
(45) Date of Patent: Aug. 27, 2013

(54) VEHICLE FRONT STRUCTURE

(75) Inventor: Koji Yoshida, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/375,604

(22) PCT Filed: Mar. 2, 2010

(86) PCT No.: PCT/JP2010/053341
§ 371 (c)(1),
(2), (4) Date: Dec. 1, 2011

(87) PCT Pub. No.: WO2011/108079
PCT Pub. Date: Sep. 9, 2011

(65) Prior Publication Data
US 2012/0074734 A1    Mar. 29, 2012

(51) Int. Cl.
*B60N 2/00* (2006.01)
(52) U.S. Cl.
USPC .............. 296/187.09; 296/203.02; 280/274
(58) Field of Classification Search
USPC ............ 296/203.02, 197.09, 187.03, 193.09, 296/203.01, 187.09; 280/274
See application file for complete search history.

(56) References Cited

U.S. PATENT DOCUMENTS

| 6,631,942 | B1 * | 10/2003 | Kitagawa | 296/187.1 |
| 7,883,113 | B2 * | 2/2011 | Yatsuda | 280/784 |
| 8,210,601 | B2 * | 7/2012 | Terada et al. | 296/187.09 |
| 2004/0200659 | A1 | 10/2004 | Miyasaka | |

FOREIGN PATENT DOCUMENTS

| JP | 57 74877 | 5/1982 |
| JP | 10 7024 | 1/1998 |
| JP | 2003 54452 | 2/2003 |
| JP | 2003 226266 | 8/2003 |
| JP | 2004 66932 | 3/2004 |

OTHER PUBLICATIONS

International Search Report Issued Jun. 8, 2010 in PCT/JP10/53341 Filed Mar. 2, 2010.

* cited by examiner

*Primary Examiner* — Joseph Pape
*Assistant Examiner* — Dana Ivey
(74) *Attorney, Agent, or Firm* — Oblon, Spivak, McClelland, Maier & Neustadt, L.L.P.

(57) ABSTRACT

When a load caused by a collision is transmitted from the front side of a vehicle, tire cutout portions of front side members are deformed by the load transmitted from the front side of the vehicle. Accordingly, the tire cutout portions of the front side members come into contact with a power unit formed of an engine or the like of the vehicle, switch a transmission path of the load to a direction corresponding to the power unit of the vehicle, and transmit the load to the power unit as a load. The tire cutout portion is formed between two engine mounts. Accordingly, a starting point from which the front side member begins to be deformed is set between the engine mounts that are two supported portions of the power unit, so that the stable bending and deformation of the front side member are controlled. Further, a transmission path of a load toward the power unit is newly formed. Accordingly, a load, which is caused by a collision or the like and transmitted from the front side of the vehicle, is dispersed on the power unit that is hard and has large mass. As a result, it is possible to increase efficiency of absorbing impact at the time of a collision.

7 Claims, 10 Drawing Sheets

VEHICLE FRONT STRUCTURE

TECHNICAL FIELD

The present invention relates to a vehicle front structure, and more particularly, to a vehicle front structure that includes side members provided at side end portions of the vehicle and extending in a front-rear direction of the vehicle.

BACKGROUND ART

Vehicle front structures considering safety at the time of a collision have been proposed. For example, Patent Literature 1 discloses a vehicle front structure where front areas of side members are formed so as to be inclined to the outside in a vehicle width direction toward the front side of a vehicle body. Sub-side members are provided at the front areas of the side members, and front end portions of the sub-side members are connected to the rear surface of a bumper reinforcement. Each of the sub-side members is provided with a deformation mode control mechanism that bends the sub-side member inward in the vehicle width direction by the input of a collision so as to make the sub-side member interfere with a power unit. Accordingly, the vehicle front structure disclosed in Patent Literature 1 reduces the deformation of a vehicle body by inducing and facilitating the rigid movement of a vehicle in a lateral direction at the time of a small overlap collision.

CITATION LIST

Patent Literature

[Patent Literature 1] Japanese Unexamined Patent Application Publication No. 2004-66932

SUMMARY OF INVENTION

Technical Problem

Meanwhile, an effect capable of transmitting a load to the power unit by the sub-side members may be generated in the above-mentioned technique. However, in the above-mentioned technique, there is no stroke that absorbs impact and the absorption of a load is insufficient. Further, in the above-mentioned technique, deformation is not stable when a load is applied to the side members, and there is a low possibility that a load can be stably transmitted to the power unit.

The invention has been made in consideration of the above-mentioned circumstances, and an object of the invention is to provide a vehicle front structure that can reduce a load to be applied to a vehicle at the time of a collision or the like.

Solution to Problem

According to the invention, there is provided a vehicle front structure that forms a framework of a vehicle front portion. The vehicle front structure includes side members that are provided at side end portions of the vehicle and extend in a front-rear direction of the vehicle. Each of the side members absorbs a load by being crushed at a front portion of the side member in the front-rear direction of the vehicle by the load transmitted from the front side of the vehicle, and includes a load transmission path switching portion that switches a transmission path of the load to the side of the vehicle by being deformed by the load transmitted to a rear portion of the side member.

According to this structure, a vehicle front structure, which forms a framework of a vehicle front portion, includes side members that are provided at side end portions of the vehicle and extend in a front-rear direction of the vehicle. Each of the side members absorbs a load by being crushed at a front portion of the side member in the front-rear direction of the vehicle by the load transmitted from the front side of the vehicle. Accordingly, it is possible to absorb impact at the time of a collision or the like. In addition, each of the side members includes a load transmission path switching portion that switches a transmission path of the load to the side of the vehicle by being deformed by the load transmitted to a rear portion of the side member. Accordingly, a load, which is caused by a collision or the like and transmitted from the front side of the vehicle, is dispersed in the lateral direction of the vehicle, so that it is possible to increase efficiency of absorbing impact at the time of a collision.

Further, according to the invention, there is provided a vehicle front structure that forms a framework of a vehicle front portion. The vehicle front structure includes side members that are provided at side end portions of the vehicle and extend in a front-rear direction of the vehicle. Each of the side members includes a load transmission path switching portion. The load transmission path switching portion comes into contact with a power unit formed of any one of a battery, an inverter, a motor, and an engine of the vehicle by being deformed by a load transmitted from the front side of the vehicle; switches a transmission path of the load to a direction corresponding to the power unit of the vehicle; and is formed between two supported portions of the power unit.

According to this structure, a vehicle front structure, which forms a framework of a vehicle front portion, includes side members that are provided at side end portions of the vehicle and extend in a front-rear direction of the vehicle. Each of the side members includes a load transmission path switching portion. The load transmission path switching portion comes into contact with a power unit formed of an engine or the like of the vehicle by being deformed by a load transmitted from the front side of the vehicle, switches a transmission path of the load to a direction corresponding to the power unit of the vehicle, and is formed between two supported portions of the power unit. Accordingly, a starting point from which the side member begins to be deformed is set between the two supported portions of the power unit, so that the stable bending and deformation of the side member are controlled. Further, a transmission path of a load toward the power unit is newly formed. Accordingly, a load, which is caused by a collision or the like and transmitted from the front side of the vehicle, is dispersed on the power unit that is hard and has large mass. As a result, it is possible to increase efficiency of absorbing impact at the time of a collision.

In this case, the transmission path of the load may be formed by the contact between the deformed load transmission path switching portion and the power unit that is formed of any one of the battery, the inverter, the motor, and the engine of the vehicle.

According to this structure, the transmission path of the load is formed by the contact between the deformed load transmission path switching portion and the power unit formed of an engine or the like. Accordingly, a load, which is caused by a collision or the like and transmitted from the front side of the vehicle, is dispersed, so that it is possible to increase efficiency of absorbing impact at the time of a collision.

Further, the load transmission path switching portion may be a recess that corresponds to the trace of a front wheel of the vehicle changed during steering.

According to this structure, the load transmission path switching portion is a recess that corresponds to the trace of a front wheel of the vehicle changed during steering. For this reason, it is possible to more stably deform the load transmission path switching portion by a load transmitted from the front side of the vehicle. Furthermore, since the load transmission path switching portion deformed by a load is used as the recess corresponding to the trace of the front wheel of the vehicle that is changed during steering, it is possible to efficiently form a load transmission path switching portion without separately forming a load transmission path switching portion. In addition, recesses, which correspond to the trace of the front wheels of the vehicle changed during steering, are formed at the side members as the load transmission path switching portions, so that the front wheels of the vehicle are received in a smaller area. Accordingly, it is possible to increase the degree of freedom of the design such as the enlargement of the area where an engine is received.

Moreover, the load transmission path switching portion may be a recess that corresponds to the trace of a front wheel of the vehicle changed during steering. The two supported portions of the power unit may be provided on each of the side members. When distances between a foot of a perpendicular to a straight line, which connects the two supported portions, from a deepest portion of the recess and the supported portions are denoted by a and b, respectively, a distance where each of the supported portions can be moved by the load is denoted by x, and a distance between the supported portion and the power unit is denoted by y, "$y \leq [x(a+b-x)]^{1/2}$" may be satisfied.

According to this structure, the load transmission path switching portion is the recess that corresponds to the trace of the front wheel of the vehicle changed during steering, and the two supported portions of the power unit are provided on each of the side members. For this reason, it is possible to more stably deform the load transmission path switching portion by a load transmitted from the front side of the vehicle. Further, since the load transmission path switching portion deformed by a load is used as the recess corresponding to the trace of the front wheel of the vehicle that is changed during steering, it is possible to efficiently form a load transmission path switching portion without separately forming a load transmission path switching portion.

In addition, recesses, which correspond to the trace of the front wheels of the vehicle changed during steering, are formed at the side members as the load transmission path switching portions, so that the front wheels of the vehicle are received in a smaller area. Accordingly, it is possible to increase the degree of freedom of the design such as the enlargement of the area where an engine is received. When distances between a foot of a perpendicular to a straight line, which connects the two supported portions, from the deepest portion of the recess and the supported portions are denoted by a and b, respectively, a distance where each of the supported portions can be moved by the load is denoted by x, and a distance between the supported portion and the power unit is denoted by y, "$y \leq [x(a+b-x)]^{1/2}$" is satisfied. Accordingly, it is possible to make the recess be deformed without fracturing the supported portions of the power unit.

Further, according to the invention, there is provided a vehicle front structure that forms a framework of a vehicle front portion. The vehicle front structure includes side members that are provided at side end portions of the vehicle and extend in a front-rear direction of the vehicle. Each of the side members includes a load transmission path switching portion that switches a transmission path of the load to the side of the vehicle by being deformed by the load transmitted to a rear portion of the side member.

According to this structure, a vehicle front structure, which forms a framework of a vehicle front portion, includes side members that are provided at the side end portions of the vehicle and extend in the front-rear direction of the vehicle. Each of the side members includes a load transmission path switching portion that switches a transmission path of the load to the side of the vehicle by being deformed by the load transmitted to the rear portion of the side member. Accordingly, a load, which is caused by a collision or the like and transmitted from the front side of the vehicle, is dispersed in the lateral direction of the vehicle, so that it is possible to increase the efficiency of absorbing impact at the time of a collision.

Advantageous Effects of Invention

According to the vehicle front structure of the invention, it is possible to increase the efficiency of absorbing impact at the time of a collision.

DESCRIPTION OF EMBODIMENTS

Figure 1:
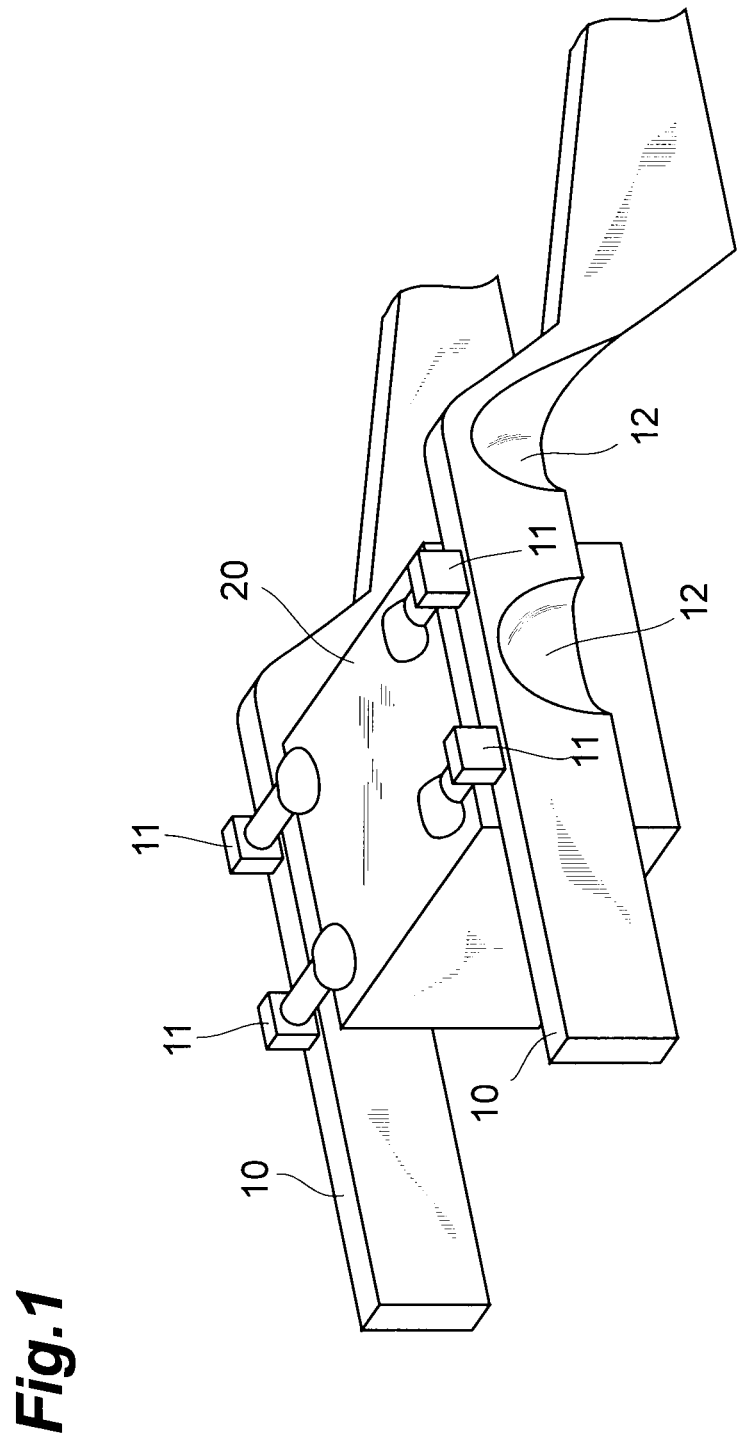
FIG. 1 is a perspective view showing a vehicle front structure according to a first embodiment.
Figure 2:
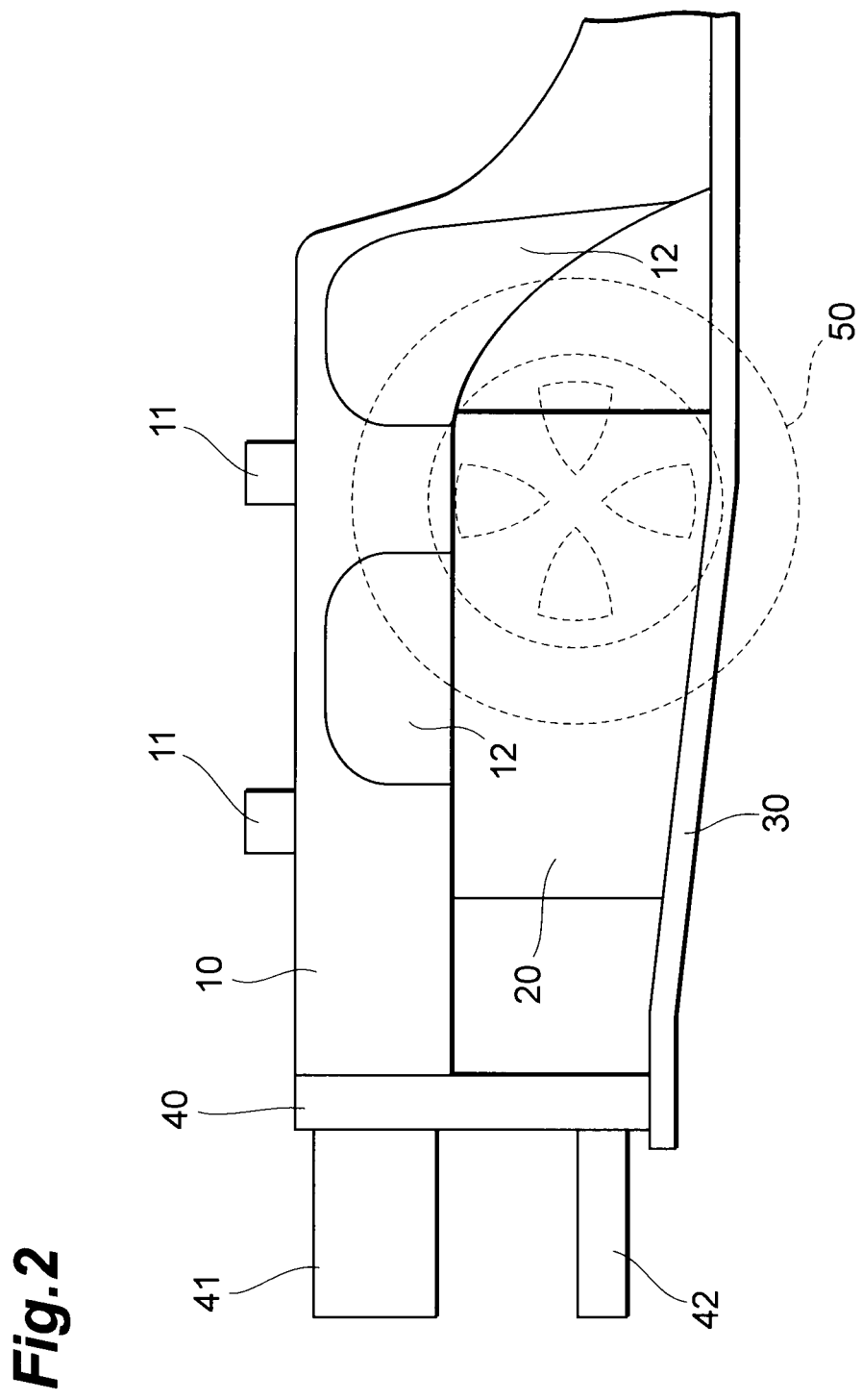
FIG. 2 is a side view showing the vehicle front structure according to the first embodiment.

Embodiments of the invention will be described below with reference to the drawings. As shown in FIG. 1, a vehicle front structure according to a first embodiment of the invention includes a pair of front side members 10. Each of the pair of front side members 10 is provided with two engine mounts 11. A total of four engine mounts 11 support a power unit 20 that includes a battery, an inverter, a motor, and an engine of a vehicle. Each of the engine mounts 11 includes a rubber bush. The engine mounts 11 support the power unit 20 by the rubber bushes so that the power unit 20 can be moved relative to the front side members 10 by only a certain amount of play. As shown in FIG. 2, the power unit 20 is also supported from below by a center member 30.

Figure 3:
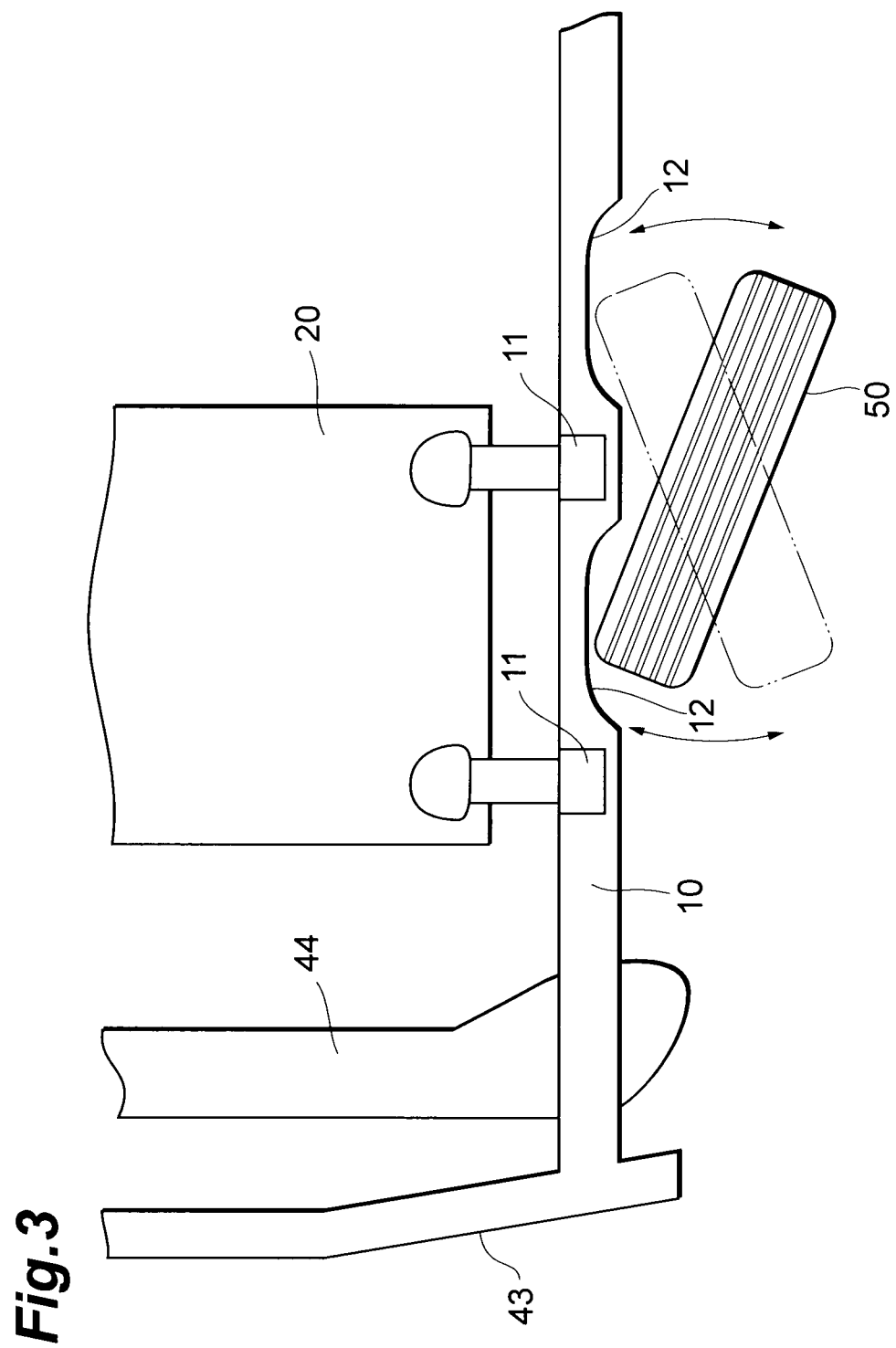
FIG. 3 is a plan view showing the vehicle front structure according to the first embodiment.

As shown in FIG. 2, a radiator 40 is positioned at the front ends of the front side members 10. Crash boxes 41 and 42 are provided in the front of the radiator 40. When a vehicle collides at the front portion thereof, the crash boxes 41 and 42 are crushed and absorb impact. As shown in FIG. 3, a front bumper reinforcement 43 is provided over the front ends of the pair of front side members 10. Further, a sub-frame 44 is provided in the rear of the front bumper reinforcement 43 over the front ends of the pair of front side members 10.

As shown in FIGS. 1 to 3, two tire cutout portions 12 are formed on the outer surface of each of the pair of front side members 10. As shown in FIG. 3, the tire cutout portions 12 are cut out with a depth where the front side member 10 does not come into contact with a tire 50 of the front wheel of which the direction is changed during the steering. That is, the tire cutout portion 12 has the shape corresponding to the trace of the tire 50 of the front wheel that is changed during the steering. Further, the front tire cutout portion 12 is formed between the two engine mounts 11. The cut-out shape of each tire cutout portion 12 is symmetric in the front-rear direction of the front side member 10 as seen from the upper side of the vehicle.

Figure 4:
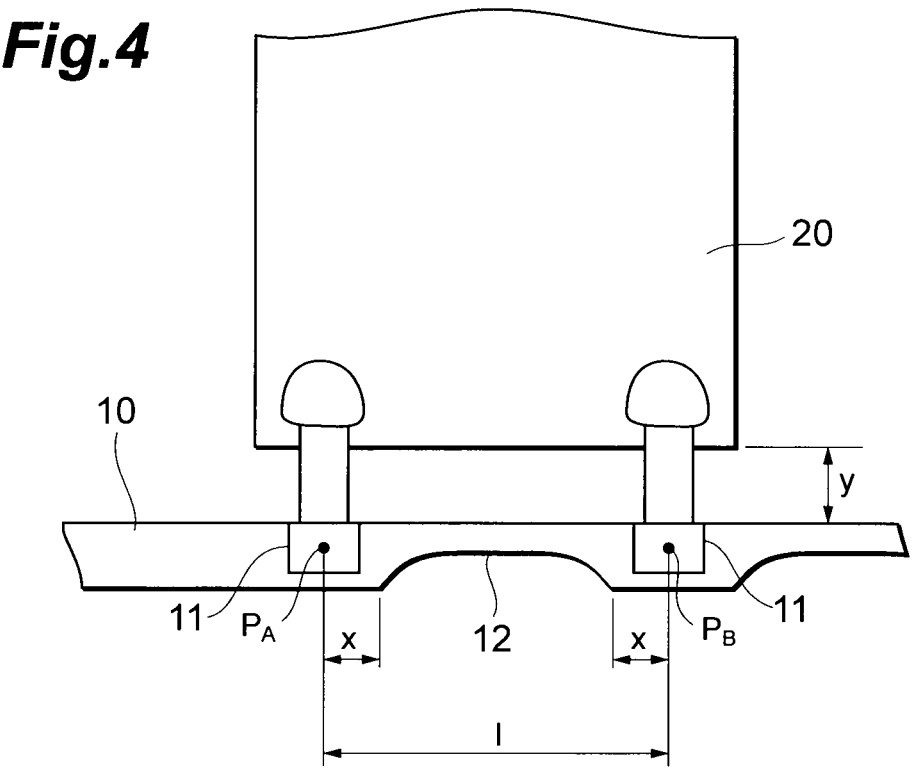
FIG. 4 is a view showing a positional relationship of the respective portions of FIG. 3.
Figure 5:
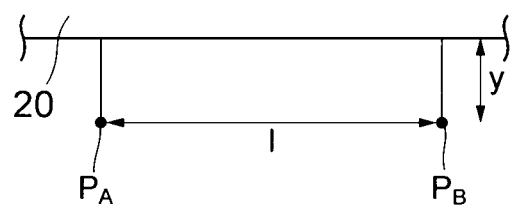
FIG. 5 is a view showing only a positional relationship of the respective portions of FIG. 4.

As shown in FIGS. 4 and 5, a distance between the support center $P_A$ and $P_B$ of the engine mounts 11 is denoted by l. A distance where each of the engine mounts 11 can be moved by a load is denoted by x. Further, a distance between the engine mount 11 and the power unit 20 is denoted by y.

Figure 6:
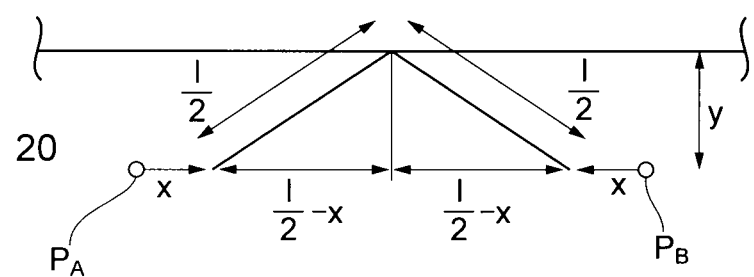
FIG. 6 is a view showing a positional relationship of the respective portions of FIG. 4 at the time of a collision.

As shown in FIG. 6, the values of l, x, and y satisfy a right triangle that has a side having a length of (½−x) and a side having a length of y as adjacent sides with a right angle interposed therebetween and has a side having a length of ½ as an oblique side. Accordingly, when a load is applied, the engine mounts 11 are moved in the ranges of the lengths x of the play thereof and the front side members 10 may be bent and come into contact with the power unit 20.

Here, "$y=\{x(1-x)\}^{1/2}$" is obtained from "$y^2+(½-x)^2=(½)^2$". Alternatively, if "$y<\{x(1-x)\}^{1/2}$" is satisfied, the distance y between the engine mount 11 and the power unit 20 may be set shorter.

Figure 7:
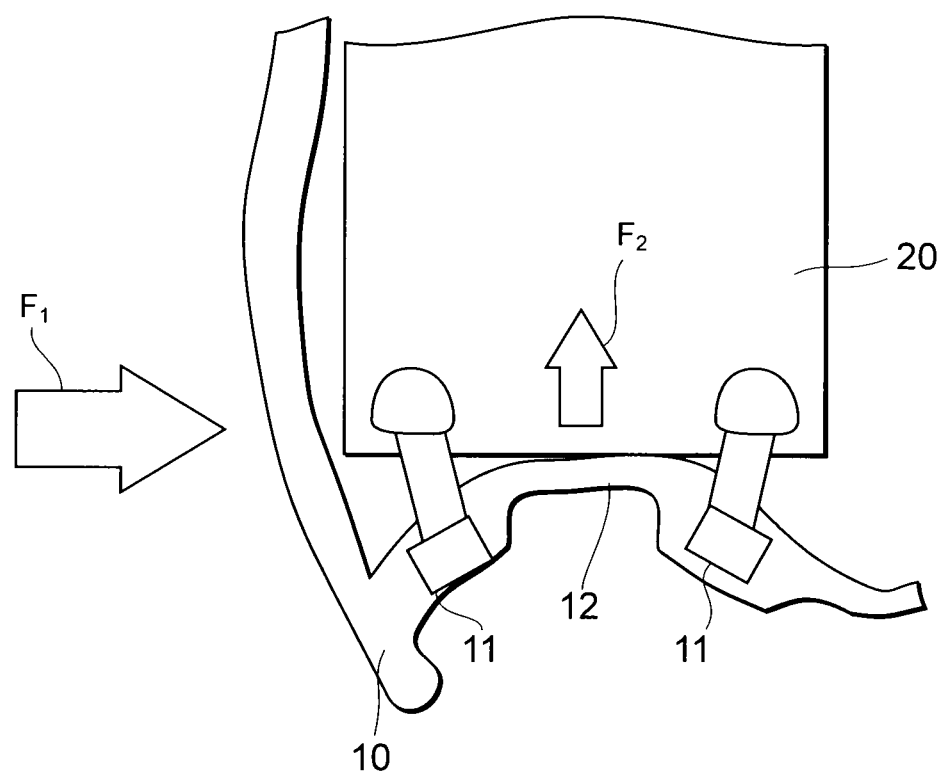
FIG. 7 is a plan view showing the operation of the vehicle front structure according to the first embodiment at the time of a collision.

The operation of the vehicle front structure according to this embodiment will be described below. When a load $F_1$ caused by a collision is transmitted from the front side of the vehicle as shown in FIG. 7, the tire cutout portions 12 of the front side members 10 are deformed by the load $F_1$ transmitted from the front side of the vehicle. Accordingly, the tire cutout portions 12 of the front side members 10 come into contact with the power unit 20 formed of the engine or the like of the vehicle, switch a transmission path of the load to a direction corresponding to the power unit 20 of the vehicle, and transmit the load $F_1$ to the power unit 20 as a load $F_2$. As described above, the tire cutout portion 12 is formed between the two engine mounts 11. Accordingly, a starting point from which the front side member 10 begins to be deformed is set between the engine mounts 11 that are two supported portions of the power unit 20, so that the stable bending and deformation of the front side member 10 are controlled. Further, a transmission path of a load toward the power unit 20 is newly formed. Accordingly, a load, which is caused by a collision or the like and transmitted from the front side of the vehicle, is dispersed on the power unit 20 that is hard and has large mass. As a result, it is possible to increase efficiency of absorbing impact at the time of a collision.

Further, in this embodiment, the front side members 10 absorb the load by being crushed at the front portions of the front side members 10 in the front-rear direction of the vehicle by the load transmitted from the front side of the vehicle. Accordingly, it is possible to absorb the impact at the time of a collision or the like.

Furthermore, the tire cutout portions 12, which correspond to the traces of the tires 50 of the front wheels of a vehicle changed during the steering, are formed at the portions of the front side members 10 that are to be deformed by a load. Accordingly, it is possible to efficiently form portions, which switch a transmission path of a load, without separately forming deformable portions.

Figure 8:
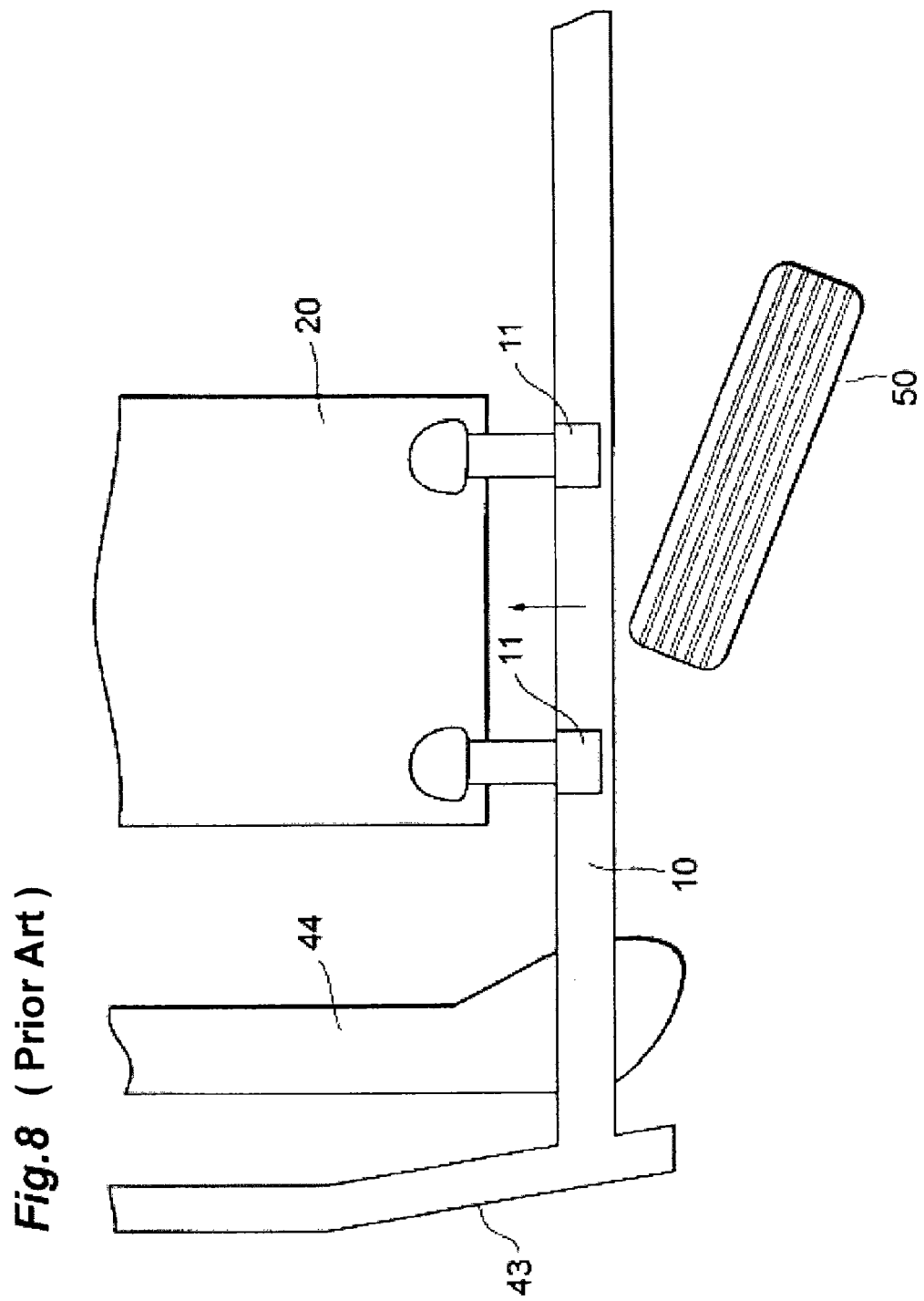
FIG. 8 is a plan view showing a vehicle front structure in the related art.

Here, if tire cutout portions 12 are not formed as shown in FIG. 8, both left and right front side members 10 need to be positioned in the middle portion of a vehicle so that the front side members 10 do not come into contact with tires 50 of front wheels of which the directions are changed during the steering. In this case, an area where a power unit 20 is received is reduced.

Meanwhile, if tire cutout portions 12, which correspond to the traces of tires 50 of front wheels of a vehicle changed during the steering, are formed at front side members 10 as in this embodiment, the tires 50 of the front wheels of the vehicle are received in a smaller area. Accordingly, it is possible to increase the degree of freedom of the design such as the enlargement of the area where the power unit 20 is received.

Moreover, in this embodiment, it is possible to make the tire cutout portions 12 be deformed without fracturing the engine mounts 11, which support the power unit 20, by making the dimensions of the respective portions satisfy "$y \leq \{x(1-x)\}^{1/2}$". Meanwhile, in this embodiment, the dimensions of the respective portions may be made to satisfy "$y>\{x(1-x)\}^{1/2}$" in order to absorb impact even though the engine mounts 11 are fractured.

Figure 9:
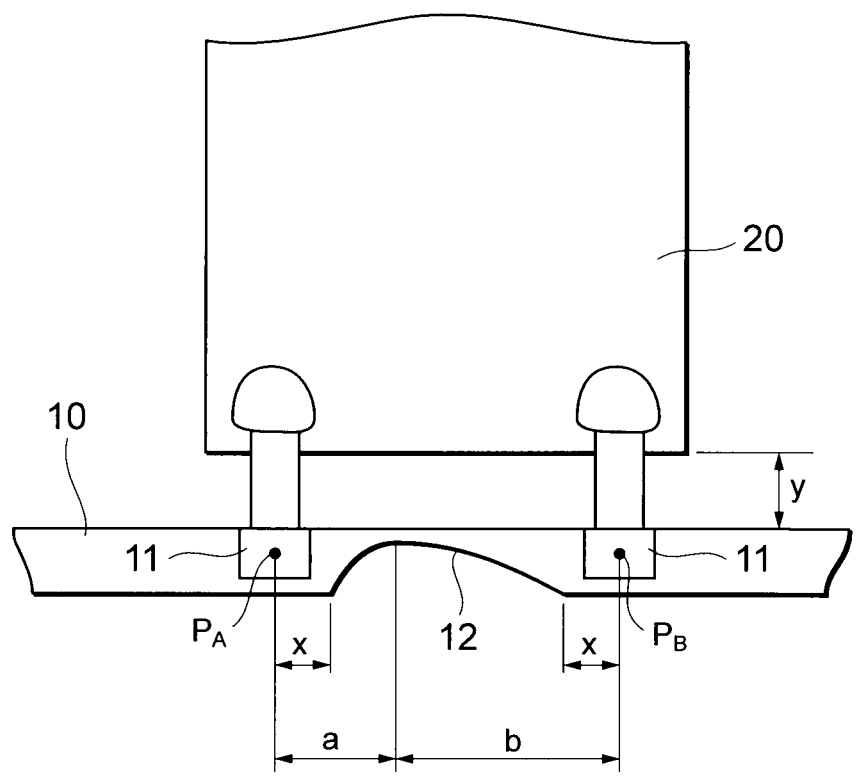
FIG. 9 is a plan view showing a vehicle front structure according to a second embodiment.

A second embodiment of the invention will be described below. As shown in FIG. 9, in this embodiment, the cut-out shape of a tire cutout portion 12 is asymmetric in the front-rear direction of the front side member 10 as seen from the upper side of a vehicle. Distances between a foot of a perpendicular to a straight line, which connects two engine mounts 11 of a power unit 20, from the deepest portion of a recess of the tire cutout portion 12 and the engine mounts 11 are denoted by a and b, respectively. A distance where each of the engine mounts 11 can be moved by a load is denoted by x, and a distance between the engine mount 11 and the power unit 20 is denoted by y.

Figure 10:
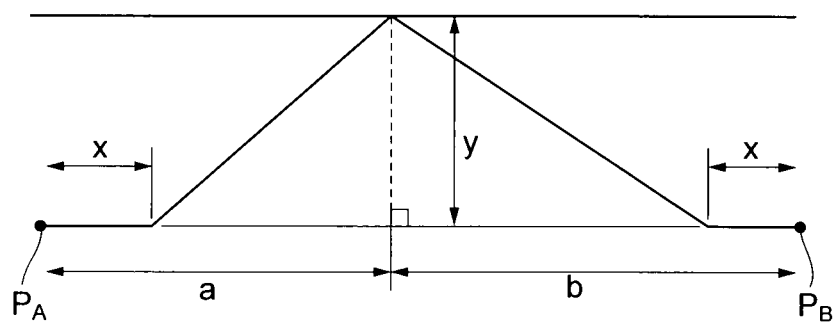
FIG. 10 is a view showing a positional relationship of the respective portions of FIG. 9 at the time of a collision.

It may be supposed that a right triangle that has a side having a length of y and a side having a length of (a−x) as adjacent sides and has a side having a length of a as an oblique side, and a right triangle that has a side having a length of y and a side having a length of (b−x) as adjacent sides and has a side having a length of b as an oblique side are formed as shown in FIG. 10 at the time of the bending of the front side member 10. "$y^2+(a-x)^2=a^2$" and "$y^2+(b-x)^2=b^2$" are satisfied by this. When both sides of these expressions are added to each other, "$2y^2+(a-x)^2+(b-x)^2=a^2+b^2$" is obtained. "$2y^2=a^2+b^2-(a-x)^2-(b-x)^2$" is obtained through transposition. "$y=\{x(a+b-x)\}^{1/2}$" can be obtained from this. Alternatively, if "$y<\{x(a+b-x)\}^{1/2}$" is satisfied, the distance y between the engine mount 11 and the power unit 20 may be set shorter.

The front side members 10 including the above-mentioned tire cutout portions 12 of the second embodiment, which are asymmetric in the front-rear direction, also exhibit the same operation as the operation of the first embodiment. In this embodiment, when distances between a foot of a perpendicular to a straight line, which connects two engine mounts 11, from the deepest portion of the recess of the tire cutout portion 12 and supported portions are denoted by a and b, respectively, a distance where each of the engine mounts 11 can be moved by a load is denoted by x, and a distance between the engine mount 11 and the power unit 20 is denoted by y, "$y \leq [x(a+b-x)]^{1/2}$" is satisfied. For this reason, it is possible to make the tire cutout portions 12 be deformed without fracturing the engine mounts 11 that support the power unit 20. Meanwhile, in this embodiment, the dimensions of the respective portions may be made to satisfy "$y > \{x(a+b-x)\}^{1/2}$" in order to absorb impact even though the engine mounts 11 are fractured.

The embodiments of the invention have been described above. However, the invention is not limited to the above-mentioned embodiments and may have various modifications.

INDUSTRIAL APPLICABILITY

According to the vehicle front structure of the invention, it is possible to increase efficiency of absorbing impact at the time of a collision.

REFERENCE SIGNS LIST

10: FRONT SIDE MEMBER
11: ENGINE MOUNT
12: TIRE CUTOUT PORTION
20: ENGINE
30: CENTER MEMBER
40: RADIATOR
41: CRASH BOX
42: CRASH BOX
43: FRONT BUMPER REINFORCEMENT
44: SUB-FRAME
50: FRONT WHEEL TIRE

The invention claimed is:

1. A vehicle front structure that forms a framework of a vehicle front portion, the vehicle front structure comprising:
   side members that are provided at side end portions of a vehicle and extend in a front-rear direction of the vehicle,
   wherein each of the side members absorbs a load by being crushed at a front portion of the side member in the front-rear direction of the vehicle by the load transmitted from a front side of the vehicle, and includes a load transmission path switching portion that changes a transmission path of the load from the front-rear direction of the vehicle toward a side of the vehicle by being deformed by the load transmitted to the side member,
   the load transmission path switching portion is a recess in the side member that corresponds to a trace of a front wheel of the vehicle during steering,
   two mounts that support a power unit are provided on each of the side members, and
   when distances between a foot of a perpendicular to a straight line, which connects the two mounts, from a deepest portion of the recess and the mounts are denoted by a and b, respectively, a distance where each of the mounts can be moved by the load is denoted by x, and a distance between the mount and the power unit is denoted by y, "$y \leq [x(a+b-x)]^{1/2}$" is satisfied.

2. The vehicle front structure according to claim 1,
   wherein the transmission path of the load is formed by the contact between the side member and the power unit that is formed of any one of a battery, an inverter, a motor, and an engine of the vehicle.

3. A vehicle front structure that forms a framework of a vehicle front portion, the vehicle front structure comprising:
   side members that are provided at side end portions of a vehicle and extend in a front-rear direction of the vehicle,
   wherein each of the side members includes a load transmission path switching portion,
   the side member comes into contact with a power unit formed of any one of a battery, an inverter, a motor, and an engine of the vehicle by the load transmission path switching portion being deformed by a load transmitted from a front side of the vehicle such that the load transmission path switching portion changes a transmission path of the load from the front-rear direction of the vehicle to a transverse direction toward the power unit of the vehicle,
   the load transmission path switching portion is formed between two mounts that support the power unit,
   the load transmission path switching portion is a recess in the side member that corresponds to a trace of a front wheel of the vehicle during steering,
   the two mounts are provided on each of the side members, and
   when distances between a foot of a perpendicular to a straight line, which connects the two mounts, from a deepest portion of the recess and the mounts are denoted by a and b, respectively, a distance where each of the mounts can be moved by the load is denoted by x, and a distance between the mount and the power unit is denoted by y, "$y \leq [x(a+b-x)]^{1/2}$" is satisfied.

4. The vehicle front structure according to claim 3,
   wherein the transmission path of the load is formed by the contact between the side member and the power unit that is formed of any one of the battery, the inverter, the motor, and the engine of the vehicle.

5. The vehicle front structure according to claim 3,
   wherein the load transmission path switching portion is a recess in the side member that corresponds to a trace of a front wheel of the vehicle during steering.

6. The vehicle front structure according to claim 4,
   wherein the load transmission path switching portion is a recess in the side member that corresponds to a trace of a front wheel of the vehicle during steering.

7. A vehicle front structure that forms a framework of a vehicle front portion, the vehicle front structure comprising:
   side members that are provided at side end portions of a vehicle and extend in a front-rear direction of the vehicle,
   wherein each of the side members includes a load transmission path switching portion that changes a transmission path of a load from the front-rear direction of the vehicle toward a side of the vehicle by being deformed by the load transmitted to the side member, and
   the load transmission path switching portion is a recess in the side member that corresponds to a trace of a front wheel of the vehicle during steering,
   two mounts that support a power unit are provided on each of the side members, and
   when distances between a foot of a perpendicular to a straight line, which connects the two mounts, from a deepest portion of the recess and the mounts are denoted by a and b, respectively, a distance where each of the mounts can be moved by the load is denoted by x, and a distance between the mount and the power unit is denoted by y, "$y \leq [x(a+b-x)]^{1/2}$" is satisfied.

* * * * *